US012200512B2

(12) United States Patent
Zhang et al.

(10) Patent No.: US 12,200,512 B2
(45) Date of Patent: Jan. 14, 2025

(54) BEAM FAILURE RECOVERY

(71) Applicant: Apple Inc., Cupertino, CA (US)

(72) Inventors: Yushu Zhang, Beijing (CN); Gang Xiong, Portland, OR (US); Yujian Zhang, Beijing (CN); Seau S. Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 17/436,125

(22) PCT Filed: Mar. 26, 2020

(86) PCT No.: PCT/US2020/024837
§ 371 (c)(1),
(2) Date: Sep. 3, 2021

(87) PCT Pub. No.: WO2020/198419
PCT Pub. Date: Oct. 1, 2020

(65) Prior Publication Data
US 2022/0159482 A1 May 19, 2022

Related U.S. Application Data

(60) Provisional application No. 62/825,510, filed on Mar. 28, 2019.

(51) Int. Cl.
H04W 24/04 (2009.01)
H04W 74/0833 (2024.01)
(52) U.S. Cl.
CPC ....... H04W 24/04 (2013.01); H04W 74/0833 (2013.01)
(58) Field of Classification Search
None
See application file for complete search history.

(56) References Cited

U.S. PATENT DOCUMENTS

2018/0302889 A1* 10/2018 Guo .................... H04W 72/046
2018/0368075 A1* 12/2018 Chen ..................... H04W 52/42
(Continued)

FOREIGN PATENT DOCUMENTS

WO 2019029400 A1 2/2019

OTHER PUBLICATIONS

Lenovo et al., "Discussion of beam failure recovery for carrier aggregation",Apr. 2018, 3GPP Draft, R1-1804211, pp. 1-3.*
(Continued)

Primary Examiner — Adnan Baig
(74) Attorney, Agent, or Firm — Eschweiler & Potashnik, LLC

(57) ABSTRACT

Techniques discussed herein can facilitate beam failure recovery (BFR) for a Secondary Cell (SCell) or Primary SCell (PSCell). One example embodiment comprises an apparatus configured to be employed in a User Equipment (UE), comprising: one or more processors configured to: generate a Physical Random Access Channel (PRACH) associated with a beam failure recovery request (BFRQ); generate a Physical Uplink Shared Channel (PUSCH) message associated with the BFRQ, wherein the PUSCH message comprises at least one Medium Access Control (MAC) Control Element (CE) that comprises one or more of an index associated with a cell for which beam failure was detected or an index associated with a new beam; and process a Physical Downlink Shared Channel (PDSCH) as a random access response (RAR) associated with the PRACH and the PUSCH message.

18 Claims, 8 Drawing Sheets

(56) References Cited

U.S. PATENT DOCUMENTS

| | | | | |
|---|---|---|---|---|
| 2019/0215888 | A1* | 7/2019 | Cirik | H04W 72/0446 |
| 2020/0007678 | A1* | 1/2020 | Zhou | H04B 7/088 |
| 2020/0260300 | A1* | 8/2020 | Cirik | H04B 7/0695 |
| 2020/0275477 | A1* | 8/2020 | Shah | H04W 74/002 |
| 2020/0351054 | A1* | 11/2020 | Jung | H04W 72/21 |
| 2020/0373992 | A1* | 11/2020 | Wang | H04B 7/088 |
| 2021/0204346 | A1* | 7/2021 | Ye | H04B 7/00 |
| 2021/0250985 | A1* | 8/2021 | Takeda | H04W 74/004 |
| 2021/0409094 | A1* | 12/2021 | Yuan | H04W 72/23 |

OTHER PUBLICATIONS

Qualcomm Incorporated, "Beam management for NR", Oct. 2018, 3GPP Draft, R1-1811633, pp. 1-13.*

Vivo "Discussion on channel structure for 2-step RACH", Feb. 25-Mar. 1, 2019, 3GPP Draft, (R1-1901669), pp. 1-5.*

International Preliminary Report on Patentability dated Sep. 28, 2021 in connection with PCT Application No. PCT/US2020/024837.

PCT Search Report dated Jun. 3, 2020 in connection with PCT Application No. PCT/US2020/024837.

PCT Written Opinion dated Jun. 3, 2020 in connection with PCT Application No. PCT/US2020/024837.

Lenovo et al; "Discussion of beam failure recovery for carrier aggregation"; 3GPP Draft; R1-1804211_BFR; vol. RAN WG1; Apr. 15, 2018; URL:http://www.3gpp.org/ftp/Meetings%5F3GPP%5FSYNC/RAN1/Docs/.

Qualcomm Incorporated; "Beam management for NR"; 3GPP Draft; R1-1811633; vol. RAN WG1; Sep. 30, 2018; URL:http://www.3gpp.org/ftp/tsg%5Fran/WG1%5FRL1/TSGR1%5F94b/Docs/R1%2D1811633%2Ezip.

Vivo; "Discussion on channel structure for 2-step RACH"; 3GPP Draft; RI-1901669; vol. RAN WG1; Feb. 16, 2019; URL:http://www.3gpp.org/ftp/tsg%5Fran/WG1%5FRL1/TSGR1%5F96/Docs/R1%2D1901669%2Ezip.

Interdigital Inc; "BFR on SCell"; 3GPP Draft; R2-1806821; vol. RAN WG2; May 20, 2018; URL:http://www.3gpp.org/ftp/Meetings%5F3GPP%5FSYNC/RAN2/Docs/.

* cited by examiner

BEAM FAILURE RECOVERY

CROSS REFERENCE TO RELATED APPLICATIONS

This application is a National Phase entry application of International Patent Application No. PCT/US2020/024837 filed Mar. 26, 2020, which claims priority to claims priority to U.S. Provisional Patent Application No. 62/825,510 filed on Mar. 28, 2019, entitled "SYSTEM AND METHOD FOR BEAM FAILURE RECOVERY," which is incorporated herein by reference for all purposes.

BACKGROUND

In the Third Generation Partnership Project (3GPP) Release 15 (Rel-15), beam failure recovery (BFR) for a Primary Secondary Cell (PSCell) is supported, which allows a User Equipment (UE) to transmit a beam failure recover request (BFRQ) to a base station (BS) such as a next generation NodeB (gNB) by physical random access channel (PRACH) when the UE declares all the control channels have failed. New beam information can be carried by the PRACH implicitly, which is based on the downlink reference signal associated with the PRACH.

DETAILED DESCRIPTION

Figure 1:
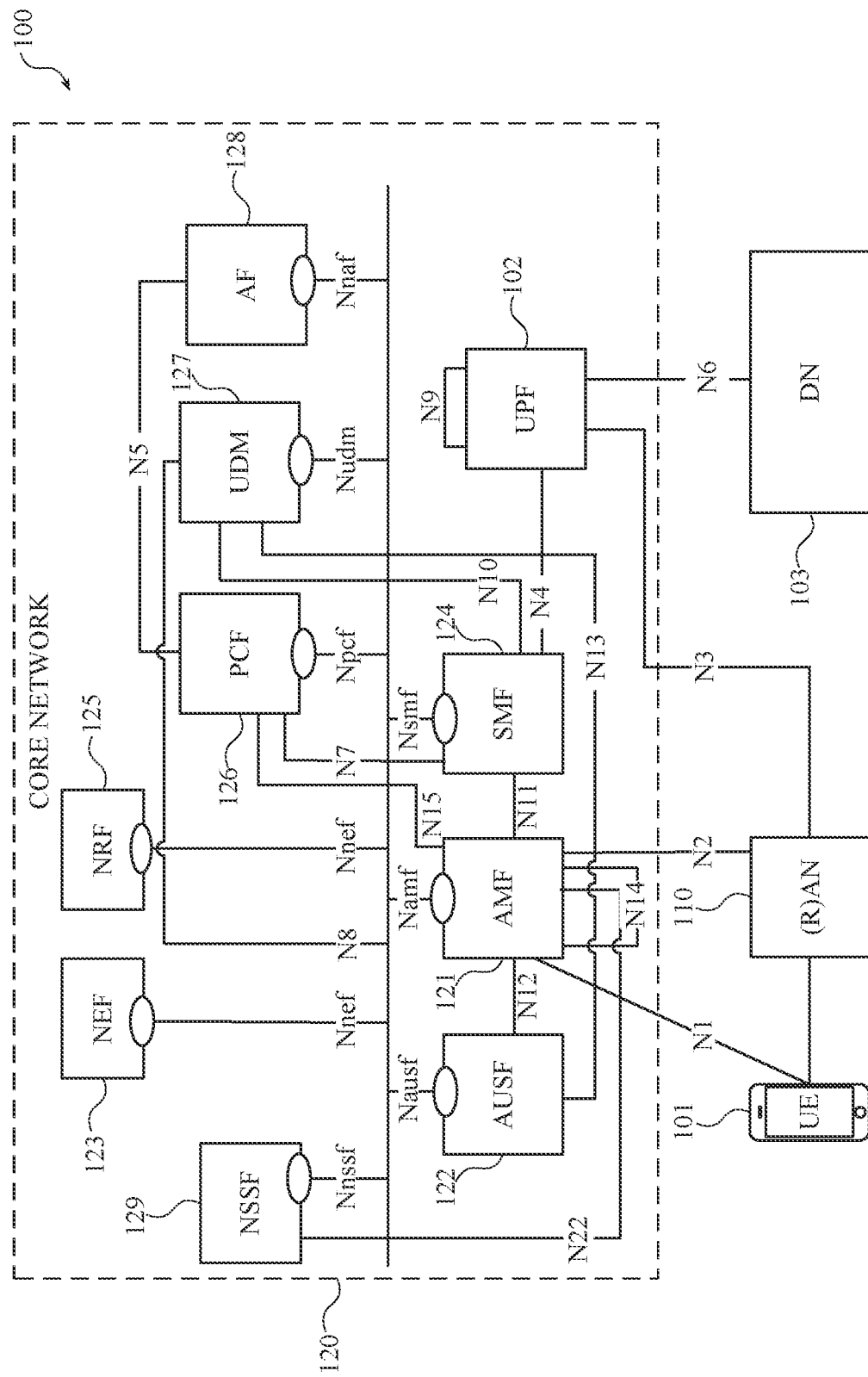
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, first through twenty-fourth additional examples for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes such as a base station (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
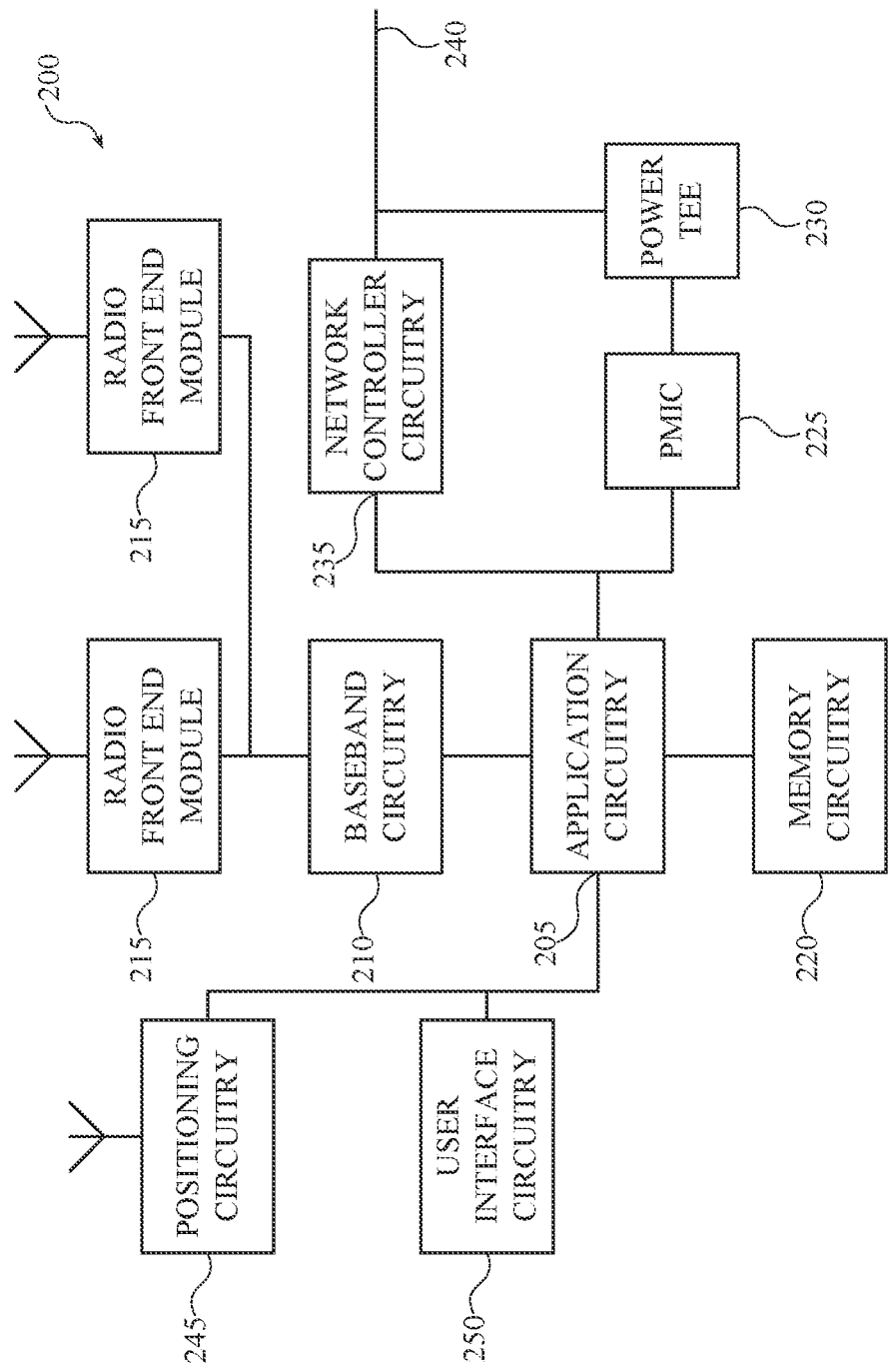
FIG. 2 is a diagram illustrating example components of an infrastructure equipment device such as a base station (BS) that can be employed in accordance with various aspects discussed herein.

Referring to FIG. 2, illustrated are example components of an infrastructure equipment device 200 in accordance with some embodiments. The infrastructure equipment 200 (or "system 200") can be implemented as a base station (e.g., eNB, gNB, etc.), radio head, RAN node such as a node of RAN 110 shown and described previously, another access point (AP) or base station (BS), application server(s), and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface circuitry 250. In some embodiments, the device 200 can include additional elements such as, for example, memory/storage, display, camera, sensor, or input/output (I/O) interface. In other embodiments, the components described below can be included in more than one device. For example, said circuitries can be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 can be coupled with or can include memory/storage elements and can be configured to execute instructions stored in the memory/storage to enable various applications or operating systems to run on the system 200. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 can comprise, or can be, a special-purpose processor/controller to operate according to the various embodiments herein. As examples, the processor(s) of application circuitry 205 can include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 200 may not utilize application circuitry 205, and instead can include a special-purpose processor/controller to process IP data received from an EPC or 5GC, for example.

User interface circuitry 250 can include one or more user interfaces designed to enable user interaction with the system 200 or peripheral component interfaces designed to enable peripheral component interaction with the system 200. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The components shown by FIG. 2 can communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX can be a proprietary bus, for example, used in a SoC based system. Other bus/IX systems can be included, such as an I2C interface, an SPI interface, point to point interfaces, and a power bus, among others.

Figure 3:
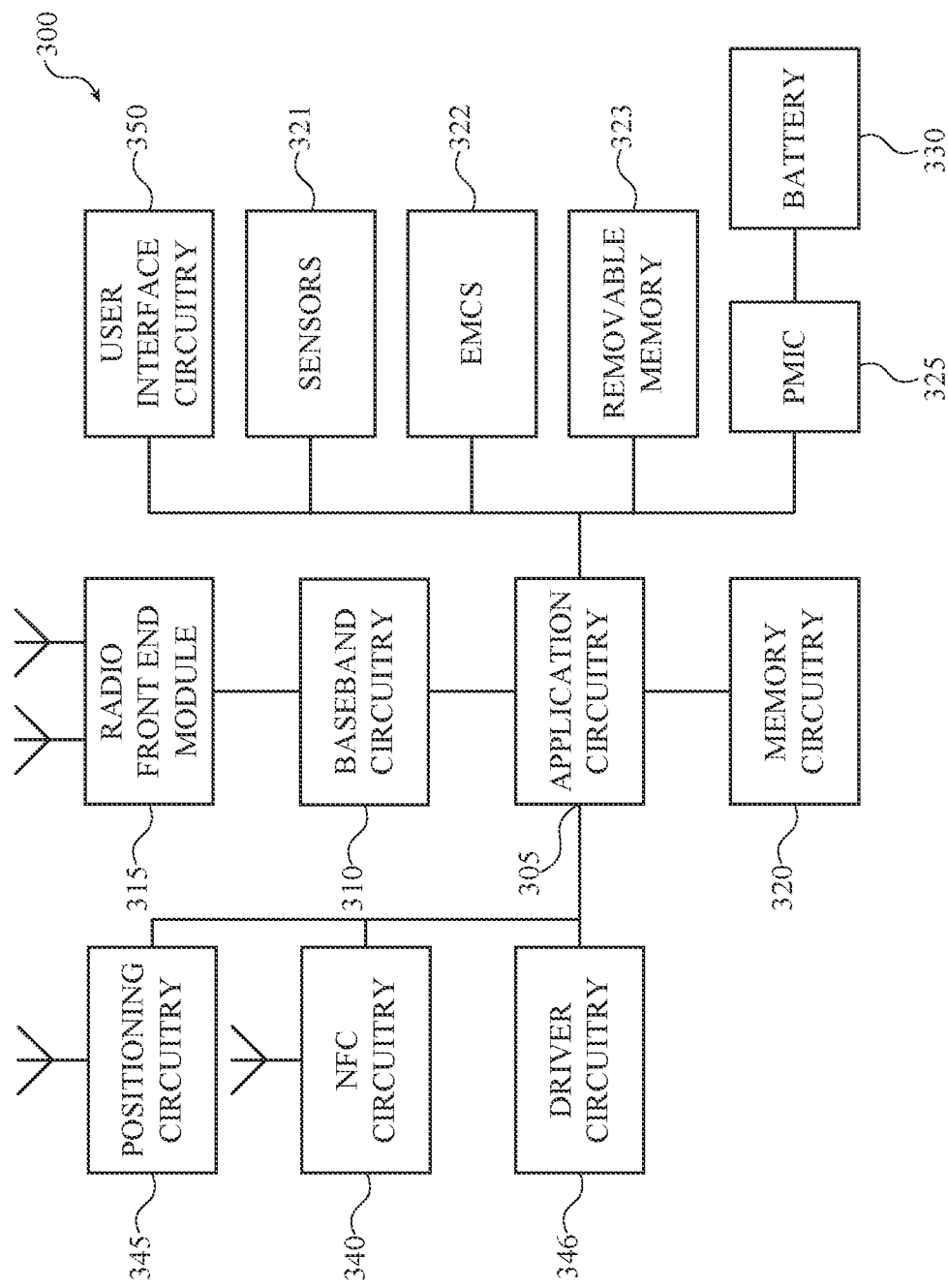
FIG. 3 is a diagram illustrating example components of a user equipment (UE) device that can be employed in accordance with various aspects discussed herein.

Referring to FIG. 3, illustrated is an example of a platform 300 (or "device 300") in accordance with various embodiments. In embodiments, the computer platform 1400 can be suitable for use as UEs 101 and/or any other element/device discussed herein. The platform 300 can include any combinations of the components shown in the example. The components of platform 300 can be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high-level view of components of the computer platform 300. However, some of the components shown can be omitted, additional components can be present, and different arrangement of the components shown can occur in other implementations.

Application circuitry 305 includes circuitry such as, but not limited to one or more processors (or processor cores), cache memory, and one or more of LDOs, interrupt controllers, serial interfaces such as SPI, 120 or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 can be coupled with or can include memory/storage elements and can be configured to execute instructions stored in the memory/storage to enable various applications or operating systems to run on the system 300. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 305 can include a general or special purpose processor, such as an A-series processor (e.g., the A13 Bionic), available from Apple® Inc., Cupertino, CA or any other such processor. The processors of the application circuitry 305 can also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 can be a part of a system on a chip (SoC) in which the application circuitry 305 and other components are formed into a single integrated circuit, or a single package.

The baseband circuitry 310 can be implemented, for example, as a solder-down substrate including one or more integrated circuits, a single packaged integrated circuit soldered to a main circuit board or a multi-chip module containing two or more integrated circuits.

The platform 300 can also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

A battery 330 can power the platform 300, although in some examples the platform 300 can be mounted deployed in a fixed location, and can have a power supply coupled to an electrical grid. The battery 330 can be a lithium ion battery, a metal-air battery, such as a zinc-air battery, an aluminum-air battery, a lithium-air battery, and the like. In some implementations, such as in V2X applications, the battery 330 can be a typical lead-acid automotive battery.

Various embodiments can employ techniques discussed herein that can facilitate BFR for a PSCell or SCell. These techniques comprise (1) content for RACH PUSCH (e.g., MsgA PUSCH, Msg3 PUSCH, etc.) that can facilitate BFR for the PSCell/SCell and/or (2) assumption(s) for UE QCL and/or spatial relation information for downlink (DL) and/or uplink (UL) control and data channels after the RACH-based (e.g., 2-step RACH, 4-step RACH) BFR is complete.

Figure 4:
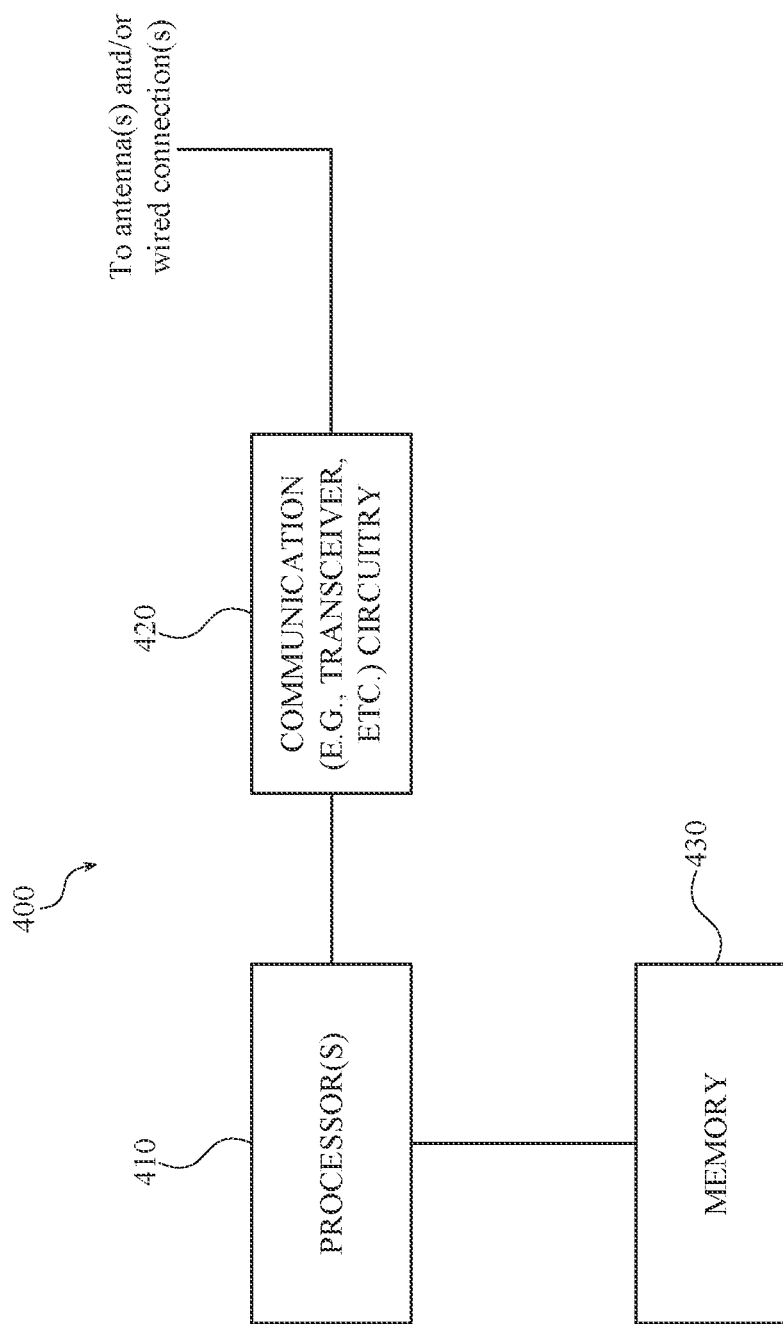
FIG. 4 is a block diagram illustrating a system that facilitates beam failure recovery (BFR) at a Secondary Cell (SCell) or Primary SCell (PSCell), according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates beam failure recovery (BFR) at a PSCell or SCell, according to various embodiments discussed herein. System 400 can include processor(s) 410, communication circuitry 420, and memory 430. Processor(s) 410 (e.g., which can comprise one or more processors of FIG. 2 or FIG. 3, etc.) can comprise processing circuitry and associated interface(s). Communication circuitry 420 can comprise, for example circuitry for wired and/or wireless connection(s) (e.g., Radio Front End Module(s) 215 or 315, etc.), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory circuitry 220 or 320, removable memory 323, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Various embodiments relate to techniques that can facilitate beam failure recovery, such as in connection with Primary Secondary Cell(s) (PSCell(s)) and/or Secondary Cell(s) (SCell(s)). A first set of techniques relates to information that can be conveyed via a Physical Uplink Shared Channel (PUSCH) associated with a Random Access Channel (RACH) procedure (e.g., PUSCH of Message A (MsgA) in a two-step RACH procedure, PUSCH of Message 3 (Msg3) in a four-step RACH procedure, etc.). A second set of techniques relates to assumptions that can be employed after beam failure recovery for quasi co-location, spatial relation information, and/or power control. Various embodiments can employ techniques of the first set of techniques and/or the second set of techniques, and can be employed at a UE or a BS such as a gNB.

As discussed above, Rel-15 provided support for BFR for PSCell(s). In Rel-16, BFR for secondary cell (SCell) is going to be supported, and the UE can transmit the failed cell index and new beam information to the gNB during a BFR procedure. In various aspects, this information can be carried by a MAC Control Element (CE).

Figure 5:
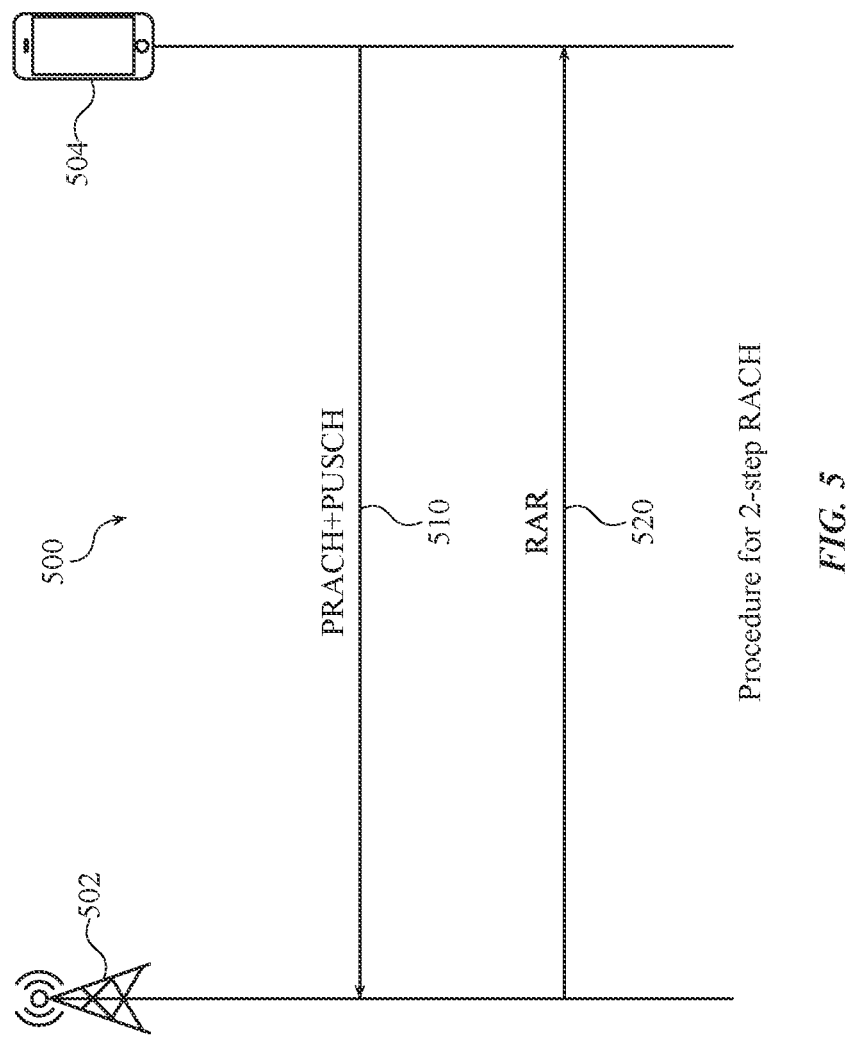
FIG. 5 is a diagram illustrating a two-step RACH procedure in connection with various aspects discussed herein.

Referring to FIG. 5, illustrated is a diagram showing a two-step RACH procedure 500 in connection with various aspects discussed herein. One possible way to transmit a beam failure recovery request (BFRQ) is to use two-step RACH procedure 500, where in the first message 510, UE 504 can transmit a PRACH as well as a PUSCH (MsgA), and after detecting the PRACH and decoding the MsgA PUSCH, gNB 502 can send a random access response (RAR) to UE by PDSCH (MsgB) at 520. Additionally, although for purposes of illustration, FIG. 5 shows a two-step RACH procedure and example embodiments discussed herein relate techniques in connection with a two-step RACH procedure to provide specific example embodiments, techniques discussed herein can also be employed in connection with a four-step RACH procedure.

However, existing techniques fail to define the information to be conveyed by MsgA PUSCH to support BFR in PsCell and SCell.

Additionally, since the same gNB-UE beam pair link could be applied to both uplink and downlink, after BFR is completed, existing techniques fail to define the UE's quasi-co-location (QCL) assumption for the downlink control and data channels, as well as the spatial relation information assumption for the uplink control and data channels.

As discussed in greater detail herein, various embodiments, which can be employed, for example, at a UE or a base station (e.g., a node of a RAN such as a gNB), can facilitate BFR for a PsCell or SCell. A first set of techniques comprises techniques for generating RACH PUSCH (e.g., MsgA PUSCH, Msg3 PUSCH, etc.) comprising content that can facilitate BFR for the PSCell/SCell. A second set of techniques comprises techniques for applying assumption(s) for power control, UE QCL, and/or spatial relation information for downlink (DL) and/or uplink (UL) control and data channels after the RACH-based (e.g., 2-step RACH, 4-step RACH) BFR is complete.

Content of MsgA/Msg3 PUSCH for BFR Request

To support BFR in a PSCell, in various aspects, a UE can convey at least the new beam information to a gNB, which can comprise an identity of the new beam and/or a beam quality of the new beam (e.g., Reference Signal (RS) Received Power (RSRP), RS Received Quality (RSRQ), Signal-to-Interference-plus-Noise Ratio (SINR)). In some scenarios, as a result of UE capability restriction, the number of downlink reference signals for beam failure detection (BFD) could be smaller than the number of Control Resource Sets (CORESETs) in active Bandwidth Part (BWP), which could be used for partial beam failure recovery. Thus, in some aspects, the UE can report the failed CORESETs information to gNB as well.

In various embodiments, at least one of the following types of information can be carried by MsgA/Msg3 PUSCH (in addition to the UE ID for contention resolution, e.g., Cell Radio Network Temporary ID (C-RNTI)) to support PsCell BFR: (1) Failed CORESET(s) index(es) and/or (2) New beam quality.

In some embodiments, the failed CORESET(s) index can be indicated based on a bitmap, where each bit can be used to indicate the status for a CORESET. For example, "0" can indicate the CORESET does not fail or the UE does not detect the status for the CORESETs, and "1" denotes the CORESET fails (or vice versa).

The new beam quality can comprise the reference signal received power (RSRP) or reference signal receiving quality (RSRQ) of the newly identified beam.

In the same or other embodiments, at least one of the following types of information can be carried by MsgA/Msg3 PUSCH (in addition to the UE ID for contention resolution, e.g., Cell Radio Network Temporary ID (C-RNTI)) to support SCell BFR or BFR for all cells: (1) Failed serving cell index(es); (2) Failed CORESET(s) index (es); and/or (3) New beam information.

The new beam information can include the new beam quality (e.g. RSRP or SINR, etc.) and/or new beam index, where a predefined value can be used to indicate that no new beam is identified in such scenarios. If BFR for all cells is supported, the failed serving cell index can be based on the PSCell and SCell index, or different Medium Access Control (MAC) Control Elements (CEs) can be used for BFR of PSCell and SCell(s) with different logical channel IDs.

In various embodiments, any of the information transmitted via MsgA/Msg3 PUSCH (e.g., including the C-RNTI, etc.) can be transmitted via one or multiple MAC Control Elements (CEs). As one example, in some embodiments, separate MAC-CEs can be used to carry C-RNTI and beam information. As another example, in other embodiments, the information can be transmitted via a new MAC-CE that can be defined to carry both C-RNTI and beam information.

As noted above, although, for the purposes of illustration, some embodiments, examples, and figures relate specifically to MsgA PUSCH content for a 2-step RACH procedure, the same content can be also transmitted in Msg3 of a 4-step RACH procedure. As one example, the beam information can be transmitted as a separate MAC CE in Msg3, or via a new MAC CE comprising both C-RNTI and beam information in Msg3.

For the embodiments above, the PRACH and MsgA/Msg3 PUSCH may be transmitted in PCell or PsCell, and the random access response may be transmitted in another serving cells, which may be configured by higher layer signaling or be the failed serving cell whose cell index is indicated by MsgA PUSCH.

Figure 6:
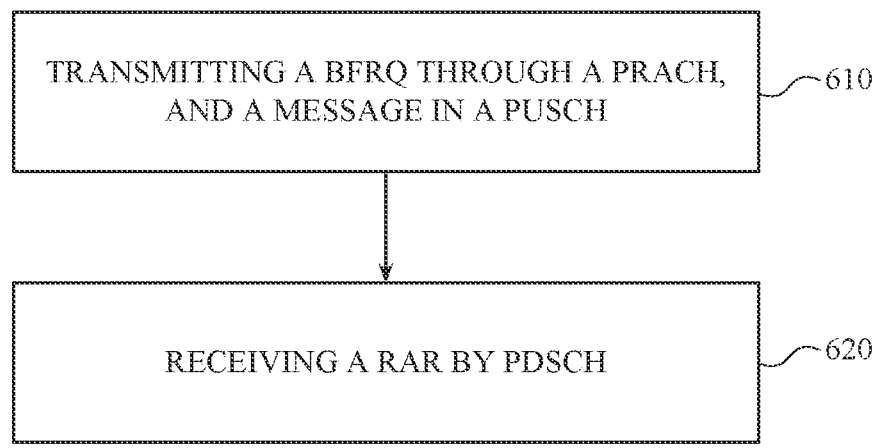
FIG. 6 is a flow diagram illustrating an example method employable at a UE that facilitates Beam Failure Recovery (BFR) via a Message A (MsgA) Physical Uplink Shared Channel (PUSCH) comprising content that facilitates PSCell/SCell BFR, according to various embodiments discussed herein.

Referring to FIG. 6, illustrated is a flow diagram of an example method employable at a UE that facilitates BFR via a MsgA PUSCH comprising content that facilitates PSCell/SCell BFR, according to various embodiments discussed herein. In other aspects, a machine readable medium can store instructions associated with method 600 that, when executed, can cause a UE (e.g., employing system $400_{UE}$) to perform the acts of method 600.

At 610, in response to a determination that beam failure has occurred for a PSCell or SCell beam, a UE can generate and transmit to a BS (e.g., gNB) a beam failure recovery request (BFRQ) via a RACH MsgA, comprising a PRACH request and a PUSCH message. In various embodiments, the PUSCH can comprise one or more of (1) Failed serving cell index(es) (e.g., for a PSCell and/or SCell(s)); (2) Failed CORESET(s) index(es); and/or (3) New beam information (e.g., new beam index(es) and/or RSRP, RSRQ, SINR, etc.). The new beam information can also indicate whether a new beam is identified or not.

At 620, in response to the MsgA transmitted at 610, the UE can receive a random access response (RAR) as a MsgB of a 2-step RACH procedure indicating successful BFR based on the information comprised within the MsgA PUSCH.

Additionally or alternatively, method 600 can include one or more other acts described herein in connection with various embodiments of a UE and/or associated system (e.g., 101, 300, 400$_{UE}$, etc.) and the first set of techniques. Furthermore, as noted above, although FIG. 6 illustrates a 2-step RACH procedure, in various embodiments, similar techniques can be employed in connection with a 4-step RACH procedure (e.g., with a Msg3 comprising content similar to that of the MsgA in method 600).

Figure 7:
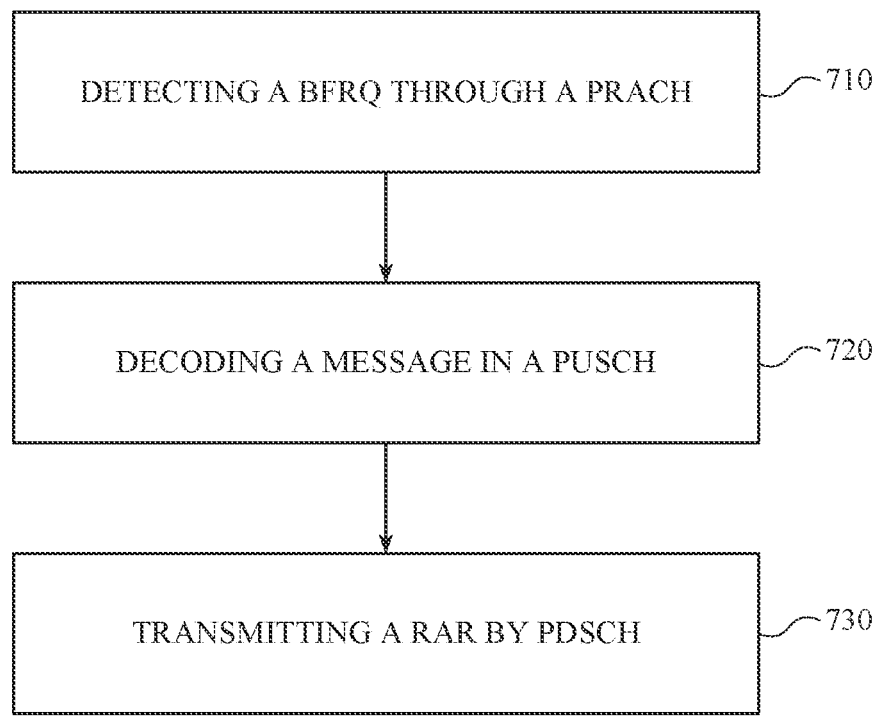
FIG. 7 is a flow diagram illustrating an example method employable at a Base Station (BS) that facilitates Beam Failure Recovery (BFR) via a Message A (MsgA) Physical Uplink Shared Channel (PUSCH) comprising content that facilitates PSCell/SCell BFR, according to various embodiments discussed herein.

Referring to FIG. 7, illustrated is a flow diagram of an example method employable at a BS (e.g., gNB, etc.) that facilitates BFR via a MsgA PUSCH comprising content that facilitates PSCell/SCell BFR, according to various embodiments discussed herein. In other aspects, a machine readable medium can store instructions associated with method 600 that, when executed, can cause a BS (e.g., employing system 400$_{UE}$) to perform the acts of method 600.

At 710, a BFRQ can be detected through a PRACH from a UE.

At 720, a MsgA PUSCH from the UE can be received and decoded, wherein the PUSCH message can comprise one or more of (1) Failed serving cell index(es) (e.g., for a PSCell and/or SCell(s)); (2) Failed CORESET(s) index(es); and/or (3) New beam information (e.g., new beam index(es) and/or RSRP, RSRQ, SINR, etc.).

At 730, a RAR can be transmitted to the UE as a MsgB of a 2-step RACH procedure in response to the BFRQ.

Additionally or alternatively, method 700 can include one or more other acts described herein in connection with various embodiments of a UE and/or associated system (e.g., a node of (R)AN 110, 200, 400$_{gNB}$, 400$_{eNB}$, etc.) and the first set of techniques. Furthermore, as noted above, although FIG. 7 illustrates a 2-step RACH procedure, in various embodiments, similar techniques can be employed in connection with a 4-step RACH procedure (e.g., with a Msg3 comprising content similar to that of the MsgA in method 700).

UE QCL/Spatial Relation Info Assumption After Receiving MsgB

Since the same beam can be applied to both the uplink and downlink channels, when beam failure occurs on the downlink, it is common for beam failure to also occur on the uplink. Accordingly, in various embodiments, after receiving MsgB (for a 2-step RACH procedure) or Msg4 (for a 4-step RACH procedure), the UE can reset the QCL and/or spatial relation information assumption(s) for the uplink and downlink channels, which are based on the newly identified beam.

In various embodiments, K slots after the UE receives the MsgB/Msg4 PDSCH, the UE can apply the newly identified beam to uplink and/or downlink control and/or data channel, wherein K can be configured by higher layer signaling or predefined (e.g., in the Third Generation Partnership Project (3GPP) specification, etc.), can be determined by UE capability per subcarrier spacing or across all subcarrier spacings, or can be based on the minimum subcarrier spacing in the DL and the UL.

In other embodiments, K slots (e.g. 2, 3, 4, etc. slots) after either the UE transmits the Acknowledgment (ACK) of MsgB/Msg4 PDSCH or the UE transmits PUSCH in accordance with an UL grant indicated in MsgB/Msg4, the UE can apply the newly identified beam to UL and/or DL control and/or data channels, wherein K can be configured by higher layer signaling or predefined (e.g., in the 3GPP specification, etc.), can be determined by UE capability per subcarrier spacing or across all subcarrier spacings, or can be based on the minimum subcarrier spacing in the DL and the UL.

Additionally, in various embodiments, the value of K for when to apply the new beam can be the same or different for UL and DL channels.

In embodiments employing both the first set of techniques and the second set of techniques, the new beam can be applied as an additional act at a time after 620, wherein the timing of when to apply the new beam can depend on the specific embodiment (e.g., K slots after the UE receives the MsgB/Msg4 PDSCH, K slots after the UE transmits the ACK for the MsgB/Msg4 PDSCH, K slots after the UE transmits PUSCH via an UL grant indicated via MsgB/Msg4, etc.).

Figure 8:
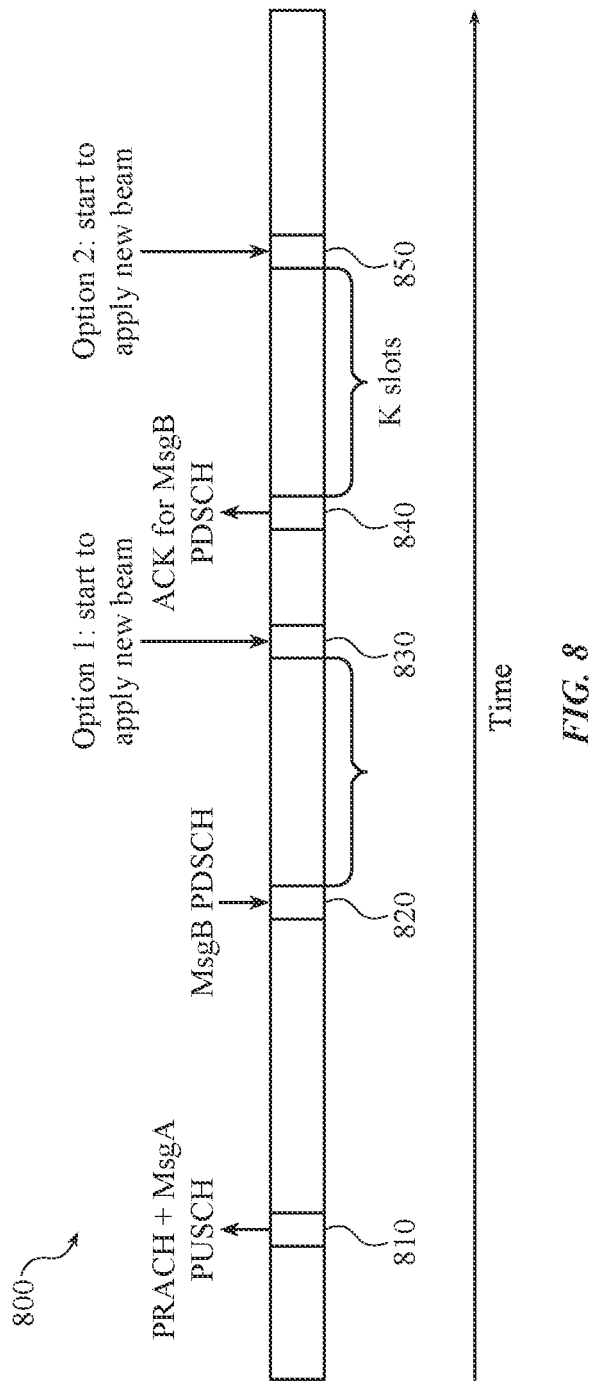
FIG. 8 is an example timing diagram illustrating timing options for applying a new beam after successful BFR, according to various embodiments discussed herein.

Referring to FIG. 8, illustrated is an example timing diagram showing timing options for applying a new beam after successful BFR, according to various embodiments discussed herein. At 810, a UE can transmit a PRACH and MsgA PUSCH (or, alternatively, a Msg3 PUSCH). At 820, the UE can receive the MsgB PDSCH (or, alternatively, Msg4). In some embodiments, as discussed herein, the UE can apply the new beam K slots after receiving the MsgB (or Msg4) PDSCH, at 830. At 840, the UE can transmit the ACK for the MsgB (or Msg4) PDSCH. In some embodiments, as discussed herein, the UE can apply the new beam K slots after transmitting the ACK for the MsgB (or Msg4) PDSCH (or K slots after the UE transmits PUSCH in accordance with an UL grant indicated in MsgB/Msg4), at 850.

In various embodiments, when the UE starts to apply the new beam to downlink channel(s), the UE can one of: apply the new beam to CORESET 0, apply the new beam to all CORESETs, or apply the new beam to all CORESETs as well as all PDSCHs. Additionally, in various embodiments, when the UE starts to apply the new beam to uplink channel(s), the UE can apply the new beam to one or more of PUCCH, PUSCH scheduled by DCI format 0_0, PUSCH scheduled by DCI format 0_1, SRS for codebook or non-codebook based transmission, or SRS for antenna switching.

To apply the newly identified beam for downlink and/or uplink channel(s), the UE can assume the corresponding downlink channel is QCLed with the downlink reference signal identified during the new beam identification at least with respect to spatial receiving parameters, and the UE can apply the same spatial domain transmission filter as the spatial domain downlink filter used to receive the new beam.

Additionally, in various embodiments, because power control is beam-specific, when the UE transmits the uplink channel with new beam, the original power control parameters (which were for the previous beam) are no longer suitable for transmission on the new beam. In various embodiments, after applying the new beam to the corresponding uplink channel(s), the power control parameters $P_O$ and alpha can be based on default power control parameters predefined or configured by higher layer signaling. Additionally, in various embodiments, the downlink reference signal for pathloss measurement should be based on the downlink reference signal associated with the newly identified beam. Also, in various embodiments, for scenarios wherein accumulative closed-loop power control is enabled, the closed-loop power parameter(s) can be reset.

ADDITIONAL EXAMPLES

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 can include the method (e.g., performed by circuitry of a User Equipment (UE)) comprising to transmit beam failure recovery request for PsCell and Secondary Cell (SCell) by 2-step random access procedure, and to determine the spatial relation information for uplink channel and signal and quasi-co-location (QCL) for downlink channel.

Example 2 can include the method of example 1 or some other example herein, wherein the first message is carried by a PRACH and a message A (MsgA) PUSCH.

Example 3 can include the method of example 1 or some other example herein, wherein at least one of the following information should be carried by MsgA PUSCH to support PsCell BFR in addition to UE ID for contention resolution, e.g.. Cell Radio Network Temporary ID (C-RNTI): Failed CORESET(s) index(es), New beam quality.

Example 4 can include the method of example 3 or some other example herein, wherein new beam quality could be the reference signal receiving power (RSRP) or reference signal receiving quality (RSRQ) of the newly identified beam.

Example 5 can include the method of example 1 or some other example herein, wherein at least one of the following information should be carried by MsgA PUSCH to support SCell BFR or BFR for all cells in addition to UE ID for contention resolution, i.e. Cell Radio Network Temporary ID (C-RNTI): Failed serving cell index(es), Failed CORESET(s) index(es) and New beam information.

Example 6 can include the method of example 5 or some other example herein, wherein if the BFR for all cells is supported, the failed serving cell index could be based at least on PsCell and SCell index, or different MAC CE could be used for PsCell BFR and SCell BFR with different logical channel IDs.

Example 7 can include the method of example 5 or some other example herein, wherein separate MAC-CEs can be used to carry C-RNTI and beam information.

Example 8 can include the method of example 5 or some other example herein, wherein a MAC-CE can be defined to carry C-RNTI and beam information.

Example 9 can include the method of example 1 or some other example herein, wherein after K slots after UE receiving MsgB PDSCH, UE shall apply the newly identified beam to uplink and/or downlink control and/or data channel.

Example 10 can include the method of example 1 or some other example herein, wherein after K slots after UE transmitting the ACK of MsgB PDSCH or UE transmitting PUSCH in accordance with UL grant indicated in the MsgB, UE shall apply the newly identified beam to uplink and/or downlink control and/or data channel.

Example 11 can include the method of examples 9-10 or some other example herein, wherein K can be configured by higher layer signaling or predefined, or be determined by UE capability per subcarrier spacing or across all subcarrier spacing or based at least on the minimum subcarrier spacing in DL and UL.

Example 12 can include the method of examples 9-10 or some other example herein, wherein when a UE starts to apply the new beam to downlink channel, the UE can apply the new beam to Control Resource Set (CORESET) 0, or all CORESETs or all CORESETs as well as all PDSCHs.

Example 13 can include the method of examples 9-10 or some other example herein, wherein when an UE starts to apply the new beam to uplink channel, the UE can apply the new beam to PUCCH, and/or PUSCH scheduled by DCI format 0_0, and/or PUSCH scheduled by DCI format 0_1, and/or SRS for codebook or non-codebook based transmission, and/or SRS for antenna switching.

Example 14 can include the method of example 9-13 or some other example herein, wherein after applying the new beam to corresponding uplink channel, the power control parameter P0 and alpha should be based at least on a default power control parameter predefined or configured by higher layer signaling.

Example 15 can include the method of examples 9-13 or some other example herein, wherein the downlink reference signal for pathloss measurement should be based at least on the downlink reference signal associated with the newly identified beam.

Example 16 can include the method of examples 9-13 or some other example herein, wherein the closed-loop power parameter should be reset if accumulative closed-loop power control is enabled.

Example 17 can include the method of example 1 or some other example herein, wherein PRACH and MsgA PUSCH can be transmitted in PCell or PsCell.

Example 18 can include the method of example 1 or some other example herein, wherein the random access response can be transmitted in another serving cells, which can be configured by higher layer signaling or be the failed serving cell whose cell index is indicated by MsgA PUSCH.

Example 19 can include a method for a user equipment (UE) in a wireless network, the method comprising: transmitting a beam failure recover request (BFRQ) through a physical random access channel (PRACH), and a message in a physical uplink shared channel (PUSCH); and receiving a random access response (RAR) by physical downlink shared channel (PDSCH).

Example 20 can include the method of example 19 and/or some other example herein, wherein the BFRQ is for a secondary cell (SCell) or a Primary SCell (PsCell).

Example 21 can include the method of example 19 and/or some other example herein, further comprising: transmitting the BFRQ as a separate Medium Access Control (MAC) Control Element (CE).

Example 22 can include the method of example 19 and/or some other example herein, further comprising: resetting quasi-co-location (QCL) assumption or spatial relation information assumption for uplink and downlink channels based at least on a newly identified beam.

Example 23 can include the method of example 19 and/or some other example herein, further comprising: applying a newly identified beam to uplink and/or downlink control and/or data channel.

Example 24 can include the method of example 19 and/or some other example herein, further comprising: determining a power control parameter based at least on a default power control parameter predefined or configured by higher layer signaling.

Example 25 can include the method of example 19 and/or some other example herein, wherein the message in the PUSCH includes cell radio network temporary ID (C-RNTI), failed serving cell index, failed CORESET(s) index(es), or new beam quality of a newly identified beam.

Example 26 can include the method of example 25 and/or some other example herein, wherein the new beam quality includes a reference signal receiving power (RSRP) or a reference signal receiving quality (RSRQ) of the newly identified beam.

Example 27 can include the method of example 25 and/or some other example herein, wherein the failed serving cell index is based at least on PsCell and SCell index, or different MAC CE carrying PsCell BFR and SCell BFR with different logical channel IDs.

Example 28 can include the method of any of the examples 19-27 and/or some other example herein, wherein the method is performed by an apparatus that is implemented in or employed by a UE.

Example 29 can include a method for a next generation nodeb (gNB) in a wireless network, the method comprising: detecting a beam failure recover request (BFRQ) through a physical random access channel (PRACH); decoding a message in a physical uplink shared channel (PUSCH); and transmitting a random access response (RAR) by physical downlink shared channel (PDSCH).

Example 30 can include the method of example 29 and/or some other example herein, wherein the BFRQ is for a secondary cell (SCell) or a Primary SCell (PsCell).

Example 31 can include the method of example 29 and/or some other example herein, further comprising: receiving the BFRQ as a separate Medium Access Control (MAC) Control Element (CE).

Example 32 can include the method of example 29 and/or some other example herein, further comprising: indicating a power control parameter by higher layer signaling.

Example 33 can include the method of example 29 and/or some other example herein, wherein the message in the PUSCH includes cell radio network temporary ID (C-RNTI), failed serving cell index, failed CORESET(s) index(es), or new beam quality of a newly identified beam.

Example 34 can include the method of example 33 and/or some other example herein, wherein the new beam quality includes a reference signal receiving power (RSRP) or a reference signal receiving quality (RSRQ) of the newly identified beam.

Example 35 can include the method of example 33 and/or some other example herein, wherein the failed serving cell index is based at least on PsCell and SCell index, or different MAC CE carrying PsCell BFR and SCell BFR with different logical channel IDs.

Example 36 can include the method of example 29-35 and/or some other example herein, wherein the method is performed by an apparatus that is implemented in or employed by a gNB.

Example 37 can include an apparatus comprising means to perform one or more elements of a method described in or related to any of examples 1-36, or any other method or process described herein.

Example 38 can include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 39 can include an apparatus comprising logic, modules, or circuitry to perform one or more elements of a method described in or related to any of examples 1-36, or any other method or process described herein.

Example 40 can include a method, technique, or process as described in or related to any of examples 1-36, or portions or parts thereof.

Example 41 can include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 42 can include a signal as described in or related to any of examples 1-36, or portions or parts thereof.

Example 43 can include a datagram, packet, frame, segment, protocol data unit (PDU), or message as described in or related to any of examples 1-36, or portions or parts thereof, or otherwise described in the present disclosure.

Example 44 can include a signal encoded with data as described in or related to any of examples 1-36, or portions or parts thereof, or otherwise described in the present disclosure.

Example 45 can include a signal encoded with a datagram, packet, frame, segment, protocol data unit (PDU), or message as described in or related to any of examples 1-36, or portions or parts thereof, or otherwise described in the present disclosure.

Example 46 can include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 47 can include a computer program comprising instructions, wherein execution of the program by a processing element is to cause the processing element to carry out the method, techniques, or process as described in or related to any of examples 1-36, or portions thereof.

Example 48 can include a signal in a wireless network as shown and described herein.

Example 49 can include a method of communicating in a wireless network as shown and described herein.

Example 50 can include a system for providing wireless communication as shown and described herein.

Example 51 can include a device for providing wireless communication as shown and described herein.

A first additional example is an apparatus configured to be employed in a User Equipment (UE), comprising: one or more processors configured to: generate a Physical Random Access Channel (PRACH) associated with a beam failure recovery request (BFRQ); generate a Physical Uplink Shared Channel (PUSCH) message associated with the BFRQ, wherein the PUSCH message comprises at least one Medium Access Control (MAC) Control Element (CE) that comprises one or more of an index associated with a cell for which beam failure was detected or an index associated with a new beam; and process a Physical Downlink Shared Channel (PDSCH) as a random access response (RAR) associated with the PRACH and the PUSCH message.

A second additional example comprises the subject matter of any variation of the first additional example, wherein the cell is a secondary cell (SCell).

A third additional example comprises the subject matter of any variation of the first through second additional example(s), wherein the one or more processors are further configured to, K slots after the PDSCH, apply quasi co-location parameters of the new beam to one or more Control Resource Sets (CORESETs) on the cell.

A fourth additional example comprises the subject matter of any variation of the third additional example, wherein the one or more CORESETs of the cell are all CORESETs on the cell.

A fifth additional example comprises the subject matter of any variation of the third through fourth additional example(s), wherein K is predefined.

A sixth additional example comprises the subject matter of any variation of the first through fifth additional example(s), wherein the one or more processors are further configured to, K slots after the PDSCH, apply a spatial domain filter of the new beam to one or more Uplink (UL) channels on the cell.

A seventh additional example comprises the subject matter of any variation of the sixth additional example, wherein K is predefined.

An eighth additional example comprises the subject matter of any variation of the sixth through seventh additional example(s), wherein the one or more processors are further configured to use a power for the one or more UL channels based at least on one or more default parameters.

A ninth additional example comprises the subject matter of any variation of the first through eighth additional example(s), wherein the PUSCH message is one of a Message A (MsgA) PUSCH message or a Message 4 (Msg4) PUSCH message.

A tenth additional example comprises the subject matter of any variation of the first through ninth additional example(s), wherein the cell is a Primary Secondary Cell (PSCell).

An eleventh additional example comprises the subject matter of any variation of the first through tenth additional example(s), wherein the at least one Medium Access Control (MAC) Control Element (CE) comprises a beam quality metric for the new beam, wherein the beam quality metric is one of a Reference Signal Received Power (RSRP), a Reference Signal Received Quality (RSRQ), or a Signal-to-Interference-plus-Noise Ratio (SINR).

A twelfth additional example is a User Equipment comprising the subject matter of any variation of the first through eleventh additional example(s).

A thirteenth example embodiment is an apparatus configured to be employed in a Base Station (BS), comprising: one or more processors configured to: process a Physical Random Access Channel (PRACH) associated with a beam failure recovery request (BFRQ); decode a Physical Uplink Shared Channel (PUSCH) message associated with the BFRQ, wherein the PUSCH message comprises at least one Medium Access Control (MAC) Control Element (CE) that comprises one or more of an index associated with a cell for which beam failure was detected or an index associated with a new beam; and generate a Physical Downlink Shared Channel (PDSCH) as a random access response (RAR) associated with the PRACH and the PUSCH message.

A fourteenth additional example comprises the subject matter of any variation of the thirteenth additional example, wherein the cell is a Secondary Cell (SCell).

A fifteenth additional example comprises the subject matter of any variation of the thirteenth through fourteenth additional example(s), wherein the cell is a Primary Secondary Cell (PSCell).

A sixteenth additional example comprises the subject matter of any variation of the thirteenth through fifteenth additional example(s), wherein the PUSCH message is one of a Message A (MsgA) PUSCH message or a Message 4 (Msg4) PUSCH message.

A seventeenth example embodiment is a machine-readable medium comprising instructions that, when executed, cause a User Equipment (UE) to: generate a Physical Random Access Channel (PRACH) associated with a beam failure recovery request (BFRQ); generate a Physical Uplink Shared Channel (PUSCH) message associated with the BFRQ, wherein the PUSCH message comprises at least one Medium Access Control (MAC) Control Element (CE) that comprises one or more of an index associated with a Secondary Cell (SCell) for which beam failure was detected or an index associated with a new beam; and process a Physical Downlink Shared Channel (PDSCH) as a random access response (RAR) associated with the PRACH and the PUSCH message.

An eighteenth additional example comprises the subject matter of any variation of the seventeenth additional example, wherein the instructions, when executed, further cause the UE to, K slots after the PDSCH, apply quasi co-location parameters of the new beam to all Control Resource Sets (CORESETs) on the SCell, wherein K is predefined.

A nineteenth additional example comprises the subject matter of any variation of the seventeenth through eighteenth additional example(s), wherein the instructions, when executed, further cause the UE to, K slots after the PDSCH, apply a spatial domain filter of the new beam to one or more Uplink (UL) channels on the SCell, wherein K is predefined.

A twentieth additional example comprises the subject matter of any variation of the seventeenth through nineteenth additional example(s), wherein the instructions, when executed, further cause the UE to use a power for the one or more UL channels based at least on one or more default parameters.

A twenty-first additional example comprises the subject matter of any variation of the seventeenth through twentieth additional example(s), wherein the PUSCH message is one of a Message A (MsgA) PUSCH message or a Message 4 (Msg4) PUSCH message.

A twenty-second additional example comprises an apparatus comprising means for executing any of the described operations of the first through twenty-first additional examples.

A twenty-third additional example comprises a machine readable medium that stores instructions for execution by a processor to perform any of the described operations of the first through twenty-first additional examples.

A twenty-fourth additional example comprises an apparatus comprising: a memory interface; and processing circuitry configured to: perform any of the described operations of the first through twenty-first additional examples.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A method, comprising: transmitting, as part of a two step random access (RACH) process on a primary cell (PCell) or primary secondary cell (PSCell), a Physical Random Access Channel (PRACH) message that is associated with a beam failure recovery request (BFRQ) and a Physical Uplink Shared Channel (PUSCH) message that is associated with the BFRQ; wherein the PUSCH message comprises at least one Medium Access Control (MAC) Control Element (CE) that comprises information including an index associated with a Secondary Cell (SCell) for which beam failure was detected, an indication of an index associated with a new beam, and a separate MAC CE comprising a cell radio network temporary identifier (C-RNTI) of a UE; receiving a Physical Downlink Shared Channel, PDSCH, message as a random access response (RAR) in response to the PRACH message and the PUSCH message; and using quasi co-location parameters of the new beam for all Control Resource Sets (CORESETs) on the Scell after 2 slots after the PDSCH.

2. The method of claim 1, wherein the information further comprises failed CORESETs indexes.

3. The method of claim 1, further comprising applying a spatial domain filter of the new beam to one or more Uplink (UL) channels on the SCell 2 slots after the PDSCH.

4. The method of claim 3, further comprising using a power for the one or more UL channels based at least on one or more default parameters.

5. The method of claim 1, wherein the PUSCH message is a Message A (MsgA) PUSCH message.

6. The method of claim 1, wherein a number of downlink reference signals for beam failure detection is smaller than a number of CORESETs in an active bandwidth part (BWP).

7. A baseband processor configured to perform operations comprising: causing transmission of, as part of a two step random access (RACH) process on a primary cell (PCell) or primary secondary cell (PSCell), a Physical Random Access Channel (PRACH) message that is associated with a beam failure recovery request (BFRQ) and a Physical Uplink Shared Channel (PUSCH) message that is associated with the BFRQ; wherein the PUSCH message comprises at least one Medium Access Control (MAC) Control Element (CE) that comprises information including an index associated with a Secondary Cell (SCell) for which beam failure was detected, an indication of an index associated with a new beam, and a separate MAC CE comprising a cell radio network temporary identifier (C-RNTI) of a UE; receiving a Physical Downlink Shared Channel, PDSCH, message as a random access response (RAR) in response to the PRACH message and the PUSCH message; and using quasi co-location parameters of the new beam for all Control Resource Sets (CORESETs) on the Scell after 2 slots after the PDSCH.

8. The baseband processor of claim 7, wherein the information further comprises failed CORESETs indexes.

9. The baseband processor of claim 7, the operations further comprising applying a spatial domain filter of the new beam to one or more Uplink (UL) channels on the SCell 2 slots after the PDSCH.

10. The baseband processor of claim 9, the operations further comprising using a power for the one or more UL channels based at least on one or more default parameters.

11. The baseband processor of claim 7, wherein the PUSCH message is a Message A (MsgA) PUSCH message.

12. The baseband processor of claim 7, wherein a number of downlink reference signals for beam failure detection is smaller than a number of CORESETs in an active bandwidth part (BWP).

13. A user equipment (UE), comprising: memory; and one or more processors configured to, when executing instructions stored in the memory, cause the UE to transmit, as part of a two step random access (RACH) process on a primary cell (PCell) or primary secondary cell (PSCell), a Physical Random Access Channel (PRACH) message that is associated with a beam failure recovery request (BFRQ) and a Physical Uplink Shared Channel (PUSCH) message that is associated with the BFRQ; wherein the PUSCH message comprises at least one Medium Access Control (MAC) Control Element (CE) that comprises information including an index associated with a Secondary Cell (SCell) for which beam failure was detected, an indication of an index associated with a new beam, and a separate MAC CE comprising a cell radio network temporary identifier (C-RNTI) of a UE; receive a Physical Downlink Shared Channel, PDSCH, message as a random access response (RAR) in response to the PRACH message and the PUSCH message; and use quasi co-location parameters of the new beam for all Control Resource Sets (CORESETs) on the Scell after 2 slots after the PDSCH.

14. The UE of claim 13, wherein the information further comprises failed CORESETs indexes.

15. The UE of claim 13, wherein the one or more processors are further configured to apply a spatial domain filter of the new beam to one or more Uplink (UL) channels on the SCell 2 slots after the PDSCH.

16. The UE of claim 15 wherein the one or more processors are further configured to use a power for the one or more UL channels based at least on one or more default parameters.

17. The UE of claim 13, wherein the PUSCH message is a Message A (MsgA) PUSCH message.

18. The UE of claim 13, wherein a number of downlink reference signals for beam failure detection is smaller than a number of CORESETs in an active bandwidth part (BWP).

* * * * *